March 4, 1924.
J. P. DOVEL
1,485,452
SETTLING APPARATUS
Filed May 9, 1921
2 Sheets-Sheet 2
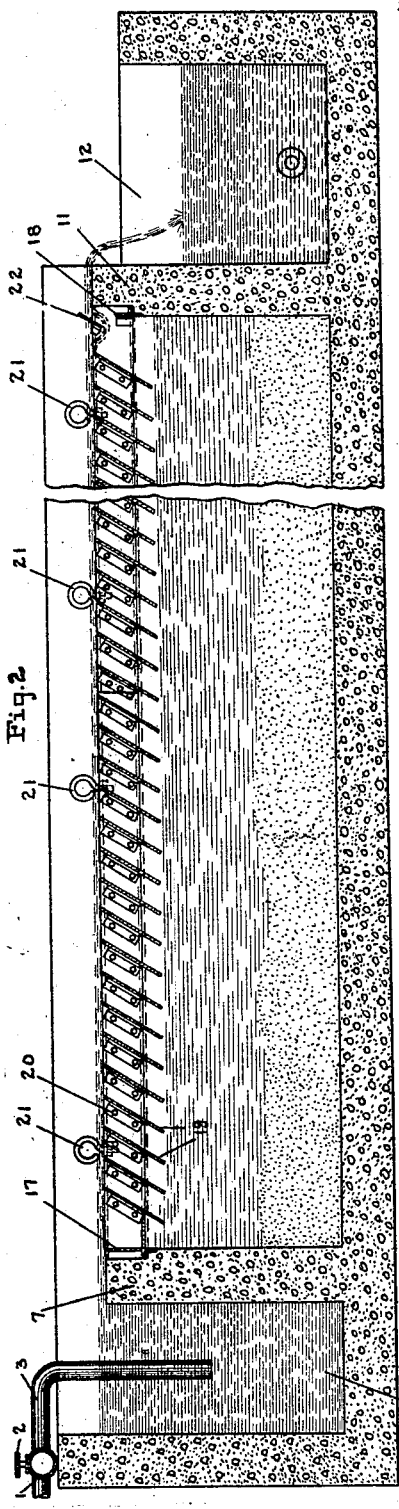
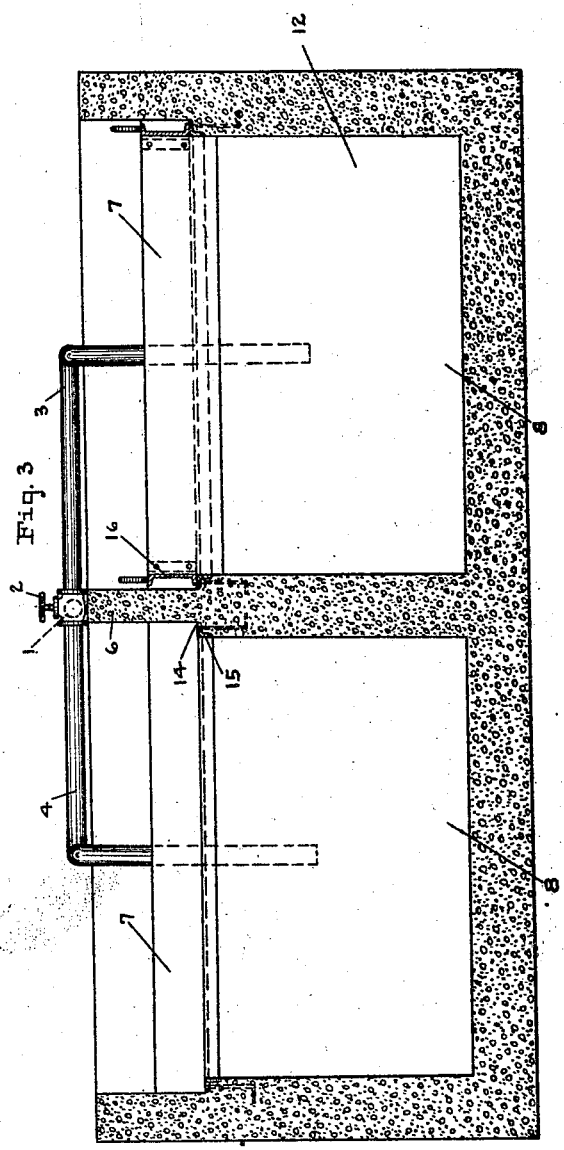
INVENTOR
J. P. Dovel
BY
ATTORNEY Patented Mar. 4, 1924.

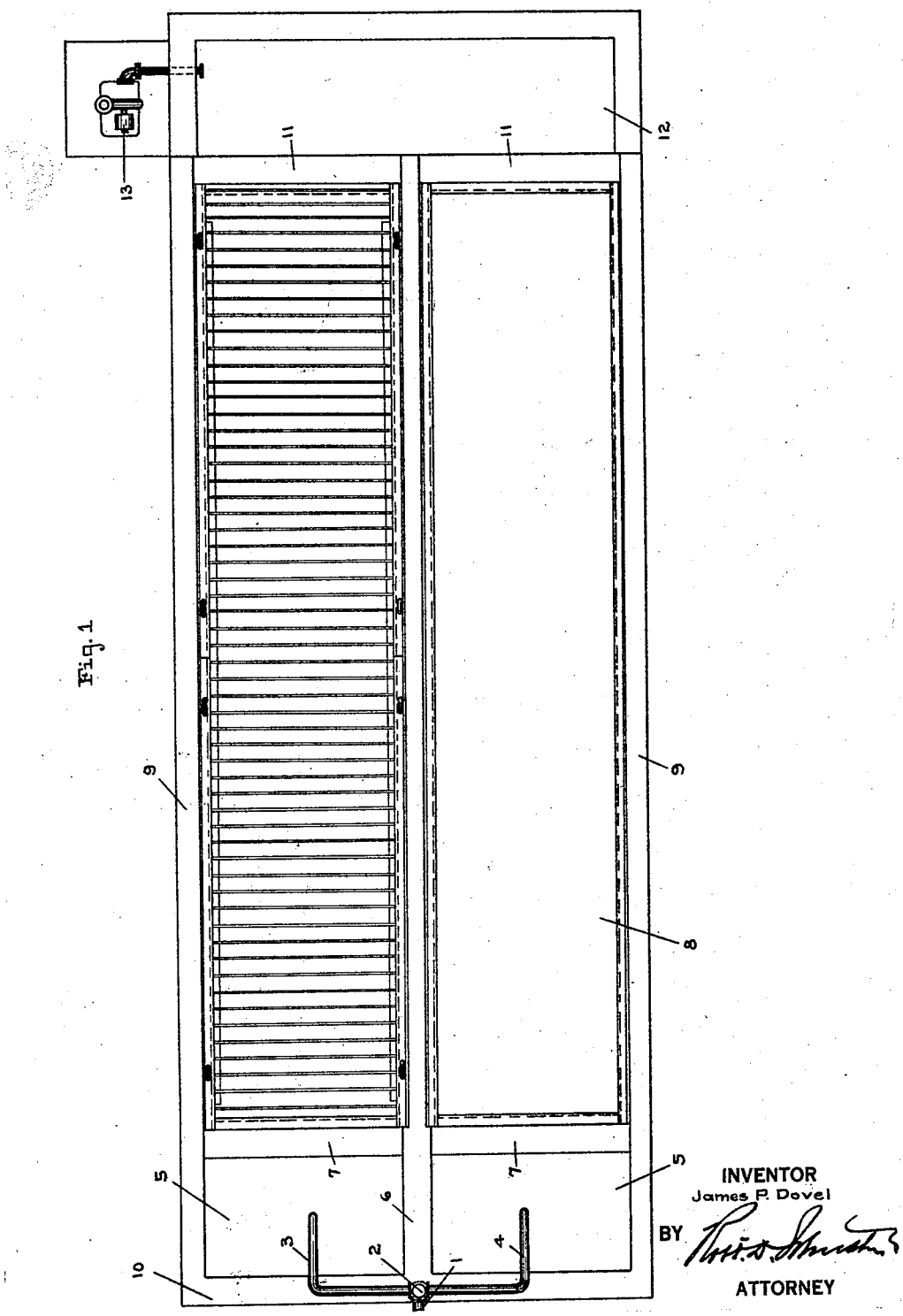

1,485,452

UNITED STATES PATENT OFFICE.

JAMES P. DOVEL, OF BIRMINGHAM, ALABAMA.

SETTLING APPARATUS.

Application filed May 9, 1921. Serial No. 467,856.

*To all whom it may concern:*

Be it known that I, JAMES P. DOVEL, a citizen of the United States of America, residing at Birmingham, in the county of Jefferson and State of Alabama, have invented certain new and useful Improvements in Settling Apparatus, of which the following is a specification.

My invention relates to an apparatus for the purpose of settling or purifying water containing foreign matter in suspense therein, and is especially adapted for the clarification of a continuously flowing stream of sludge water.

My invention is more particularly concerned with the development of a commercially practical clarification apparatus which will be comparatively inexpensive and which is adapted to effect a purification of a continuously flowing stream of water such as is discharged from blast furnace gas cleaners operating in accordance with the inventions forming the subject matters of my Letters Patents Nos. 1,001,738, and 1,001,740, wherein a relatively small continuously flowing stream of water is utilized to catch, collect and carry off from the cleaner the flue dust and other foreign matter removed therein from the gas. In designing such a purifying apparatus it is important to have in mind the normal operating facilities available at blast furnace plants to the end that such shall be made use of as far as possible in the operation of the purifying apparatus.

My invention contemplates the provision of twin settling tanks adapted alternately to receive the flow of sludge water to be purified and having a common transferable baffling frame which is adapted to be lifted by a locomotive crane and transferred from the tank last used to the one next to go into service. By the provision of valve means to divert the sludge stream to the desired tank it is obvious that each tank can be utilized until the desired amount of flue dust or sediment is collected therein, which is preferably an amount sufficient to load a car, whereupon the locomotive crane is made use of to transfer the contents of flue dust, etc., from the tank last used to the car or other point of discharge without interfering with the purifying action proceeding continuously in the other tank.

My invention also involves certain improvements in the design of the baffle rack which is interposed between a deep bottom stratum of quiet water, wherein sedimentation takes place, and the top stratum of current flow with free communication between the strata. In my preferred arrangement the rack comprises a marginal portable frame normally resting on suitable seats in the top of the settling tank and having inclined transverse baffles closely associated which are inclined so as to most effectively prevent the creation of eddies or currents in the lower stratum by the current flow in the upper stratum, the length of the tank and the rate of flow in the upper stratum being calculated to effect the purification of the upper stratum before its discharge from the tank.

My invention in its preferred embodiment will be best understood by reference to the accompanying drawings, which form a part of this specification, and in which:—

Fig. 1 is a plan view of my duplex settling apparatus showing the baffling rack in operating position in the left hand tank.

Fig. 2 is an enlarged longitudinal vertical sectional view broken away through the left hand tank.

Fig. 3 is a transverse vertical cross sectional view still further enlarged taken on the line 3—3 of Fig. 1.

Similar reference numerals refer to similar parts throughout the drawings.

As illustrated, the sludge stream to be purified or clarified flows through a pipe 1 under control of a three-way valve 2 to the discharge pipe 3 or 4, the discharge end of which depends in the trap chamber 5 sufficiently to effectively seal the pipe. In the arrangement shown, each discharge pipe 3 or 4 enters its respective trap chamber 5, which chambers are separated by a partition 6 from each other and by overflow walls 7 from settling tanks 8. The side walls of the trap chambers are continuations of the side walls 9 of the tanks and the partition 6 is a continuation of the partition separating the two tanks. The sides 9 and center partition 6 rise to the level of the end wall 10 of the trap chambers, the walls 7 being lower than the walls 6 and 9 so as to form an overflow for the discharge of the stream of water to be clarified from the chambers 5 into their respective tanks 8. At the discharge end of the tanks 8 I provide walls 11 corresponding in height with the walls 7 and adapted to form an overflow from which the clarified stream from each tank flows into the sump 12 from which it is adapted to be drawn off by a centrifugal pump or like element 13 and returned to the point of use.

The side and end walls of each tank 8 adjacent to their upper top edges are reduced to form the seats or shoulders 14, which preferably are protected by angle irons 15 suitably anchored or fastened to the tank walls in any suitable manner. These shoulders lie in a common horizontal plane and are adapted to receive and support the baffle rack which will now be described.

The baffle rack is formed by side channel irons 16 cross connected at the front end of the tank by a channel iron 17 and cross connected at the rear of the tank by an angle iron 18 disposed at the lower edge of the side channel and having its upturned flange terminating approximately opposite the center of the channels. The side channels support a series of closely associated relatively narrow straight inclined baffle plates 19, which extend between the channel irons 16 and are attached thereto by angle irons 20. The upper edges of these baffles lie substantially in the same level with the top edge of the marginal frame walls while the lower ends of the baffles project slightly below the frame. Preferably the baffle rack is divided into longitudinal half sections for convenience in handling, each section having eye bolts 21 which are adapted to receive the crane tackle by means of which the rack sections are intended to be picked up and transferred from the seat 14 in one tank 8 to the corresponding seat in the adjacent tank.

At the discharge end of the baffle rack I provide a narrow transverse baffle 22, the upper edge of which projects above the normal water level in the tanks and the lower edge of which stops substantially above the top level of the angle iron 18 and close to the top of the rack frame.

The operation of my invention is as follows. The sludge water containing the impurities to be decanted therefrom is discharged through pipe 3 or 4 into the desired trap chamber 5 in which the fluid stream spreads and flows in a relatively shallow wide stream across the overflow wall 7 and enters the settling tank 8 in operation. It will be observed that the overflow levels of the walls 7 and 11 are in substantially the same plane so that the fluid tends to flow over the baffles in a thin shallow stream lengthwise of the settling tank. The baffles in the rack in the operating tank, having their upper edges below the zone of flow of this upper stratum or stream, and being inclined as they are do not tend to divert the flowing stream into the liquid in the tank below the rack, which constitutes the stratum of sedimentation. Due to the shallowness of the flowing top stratum and the greater specific gravity of the foreign matter in suspense therein, all particles of such foreign matter tend gradually to settle downwardly through the top stratum as it progresses towards the discharge end in doing which they successively settle into the spaces between the baffles. As the particles enter the spaces between the baffles they work gradually therethrough sliding down the baffles into the stratum of sedimentation, which by the interposition of the baffles is kept free of eddies or currents which will disturb efficient sedimentary deposit of all such heavier foreign matter in suspense in the liquid. The length of the tank 8 is designed to cause the water overflowing to be practically freed of the foreign matter in suspense therein by this settling process and without bringing it to rest or disturbing the quiet evenness of its slow flow. As a result the purified stream flows continuously into the collecting basin 12 while the flue dust and foreign matter in suspense is caught and deflected into quiet settling zone of the tank and there deposited until the tank fills up to its storage capacity which as stated, can be a car load capacity of flue dust or other matter of sedimentation. When this occurs the valve 2 is reversed to direct the sludge water into the other trap chamber 5, and a crane or suitable lifting tackle is provided to engage the hook eyes 21 of the rack sections successively and transfer them from the settling tank last in service to the other tank, whereupon the operation proceeds as before in the latter tank.

The baffle 22, which alone projects above the rack frame, is designed to catch any floating matter, oil or the like, and to deflect the stream under this baffle and above the angle iron 18 before it flows over the wall 11.

This invention is not intended to be restricted in scope to the specific embodiments shown, but contemplates such modifications as come within the spirit and scope of the claims.

Having thus described my invention, what I claim as new and desire to secure by Letters Patent, is:—

1. In a water purification apparatus, two similar elongated tanks, each having means for the inflow of water to be purified at one end and the overflow of the purified water at the other end, a common marginal rack adapted to be transferred from one to the other tank, means to mount said rack in the top of each tank, and a series of transverse closely associated narrow baffles mounted in said rack.

2. A water purification apparatus according to claim 1, in which the common marginal rack is formed in sections, each having a series of said baffles mounted therein and each having connections for lifting tackle.

3. In a water purification apparatus, elongated twin tanks, each having a wide inlet port at one end and a wide outlet port at the opposite end, said ports lying in substantially the same horizontal plane, means to divert a stream of water to be purified to the desired tank, each tank having a marginal recess surrounding its top wall forming a seat for a baffle rack, and a portable baffle comprising a marginal rack frame and transverse closely associated narrow baffle plates which is adapted to be transferred from tank to tank, said marginal frame being adapted to rest on said shoulders.

4. A purification apparatus comprising twin elongated tanks, each having its end walls lowered to form inlet and outlet overflows for the stream to be purified, rack supports provided about the upper portion of each tank, and a portable baffle rack adapted to be transferred from tank to tank and adapted to be seated on one or the other of said supports, each rack comprising a marginal frame and transverse closely associated parallel baffles adapted in operating position to have their upper edges in substantially the same plane with said overflow edges of the end tank walls and with their bottom edges remote from the bottom of the tank to leave a deep bottom chamber for sedimentation.

5. A purification apparatus comprising twin purification tanks, each tank having an intermediate transverse wall subdividing from the main body of the tank at one end a trap chamber, and valve controlled ducts discharging into said trap chambers below the level of said transverse wall, said wall forming an overflow ledge to each tank, and a horizontal transferable baffle rack adapted to subdivide the tank in which it is mounted into two zones, the upper zone having its lower level substantially in the plane of said overflow ledges.

In testimony whereof I affix my signature.

JAMES P. DOVEL.

Witness:
NOMIE WELSH.